(12) United States Patent
Thomas et al.

(10) Patent No.: US 12,269,399 B2
(45) Date of Patent: Apr. 8, 2025

(54) BASEPLATE ELECTRICAL CONTACTS

(71) Applicant: Ford Global Technologies, LLC, Dearborn, MI (US)

(72) Inventors: Galen Keith Thomas, Dearborn, MI (US); Michael Azzouz, Farmington, MI (US); Jay Meyer, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 342 days.

(21) Appl. No.: 17/716,034

(22) Filed: Apr. 8, 2022

(65) Prior Publication Data

US 2023/0115236 A1 Apr. 13, 2023

Related U.S. Application Data

(60) Provisional application No. 63/254,317, filed on Oct. 11, 2021.

(51) Int. Cl.
| | |
|---|---|
| *B60R 16/023* | (2006.01) |
| *B60R 11/00* | (2006.01) |
| *B60R 16/02* | (2006.01) |
| *H01R 13/24* | (2006.01) |
| *H01R 13/52* | (2006.01) |
| *H01R 43/26* | (2006.01) |

(52) U.S. Cl.
CPC ............ *B60R 16/023* (2013.01); *B60R 11/00* (2013.01); *B60R 16/0207* (2013.01); *H01R 13/24* (2013.01); *H01R 13/5202* (2013.01); *H01R 43/26* (2013.01); *H01R 2201/26* (2013.01)

(58) Field of Classification Search
CPC ... B60R 11/00; B60R 16/023; B60R 16/0207; H01R 3/26; H01R 13/24; H01R 13/5202; H01R 2201/26
USPC ........................................... 224/42.32
See application file for complete search history.

(56) References Cited

U.S. PATENT DOCUMENTS

| | | | |
|---|---|---|---|
| 4,455,459 A | 6/1984 | Smith | |
| 5,306,156 A * | 4/1994 | Gibbs | H01R 13/639 |
| | | | 224/315 |
| 6,007,346 A | 12/1999 | Gutierrez et al. | |
| 6,527,154 B2 * | 3/2003 | Larsen | B60R 5/00 |
| | | | 224/571 |
| 10,583,962 B2 * | 3/2020 | Brunner | B25H 1/04 |
| 10,703,534 B2 | 7/2020 | Brunner et al. | |
| D895,966 S | 9/2020 | Brunner et al. | |
| D895,967 S | 9/2020 | Brunner et al. | |
| D896,517 S | 9/2020 | Brunner et al. | |
| D896,518 S | 9/2020 | Brunner et al. | |
| D897,103 S | 9/2020 | Brunner et al. | |
| D898,320 S | 10/2020 | Brunner et al. | |
| 10,870,453 B2 * | 12/2020 | Elder | B60R 9/052 |
| 10,962,218 B2 | 3/2021 | Plato et al. | |

(Continued)

OTHER PUBLICATIONS

US 10,947,009 B2, 03/2021, Brunner et al. (withdrawn)

*Primary Examiner* — Peter N Helvey
(74) *Attorney, Agent, or Firm* — Vichit Chea; Carlson, Gaskey & Olds, P.C.

(57) ABSTRACT

An accessory attachment system includes a baseplate that provides an attachment interface on a vehicle. The baseplate is configured to engage with an accessory to secure the accessory to the vehicle. The baseplate and the accessory are configured to electrically connect to each other through an electrical contact interface.

20 Claims, 6 Drawing Sheets

(56) References Cited

U.S. PATENT DOCUMENTS

| | | |
|---|---|---|
| 10,981,696 B2 | 4/2021 | Brunner et al. |
| D917,977 S | 5/2021 | Brunner et al. |
| D918,584 S | 5/2021 | Brunner et al. |
| D919,296 S | 5/2021 | Brunner et al. |
| 11,008,136 B2 | 5/2021 | Brunner et al. |
| 11,027,883 B1 | 6/2021 | Brunner et al. |
| D920,671 S | 7/2021 | Brunner et al. |
| D923,935 S | 7/2021 | Brunner et al. |
| 11,192,690 B1 | 12/2021 | Brunner et al. |
| 11,268,691 B2 | 3/2022 | Plato et al. |
| 11,365,026 B2 | 6/2022 | Brunner et al. |
| 11,427,382 B2 | 8/2022 | Brunner et al. |
| 11,465,805 B2 | 10/2022 | Brunner et al. |
| 2014/0084680 A1 | 3/2014 | Tseng |
| 2020/0148280 A1* | 5/2020 | Elder ........................ B60R 9/02 |
| 2021/0159653 A1* | 5/2021 | Caldwell .............. H02K 13/003 |
| 2021/0265776 A1* | 8/2021 | Moulin .................... F16H 1/04 |
| 2023/0069379 A1* | 3/2023 | Oros Cisneros ........ E05B 77/00 |
| 2023/0271707 A1* | 8/2023 | Vandewall ............. H01R 33/88 |
| | | 244/118.6 |

* cited by examiner

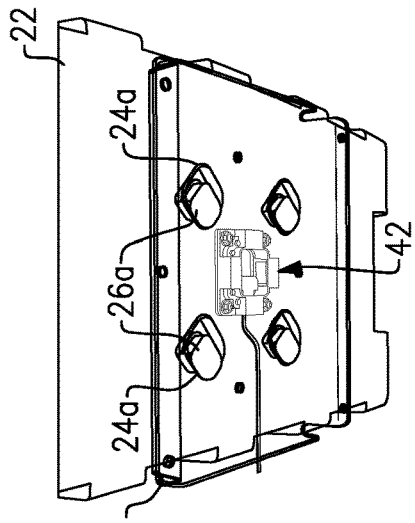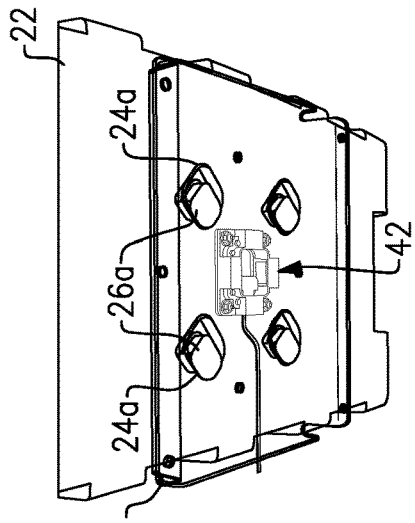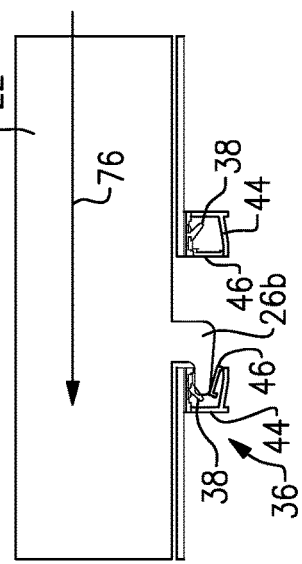
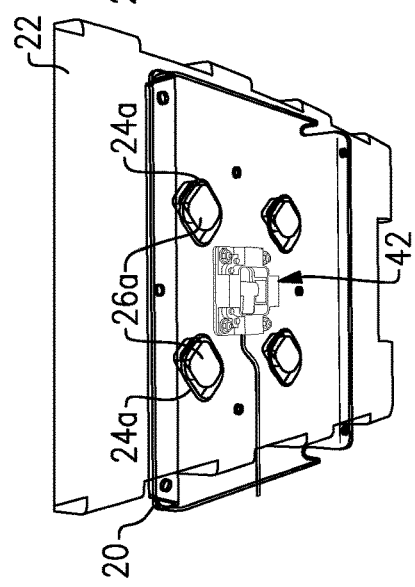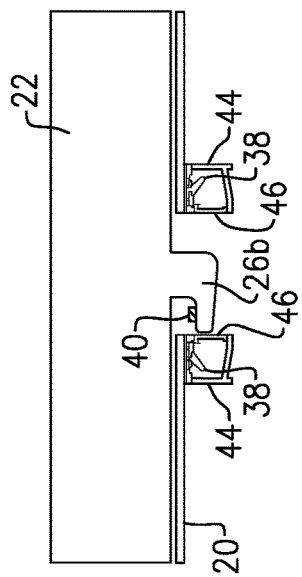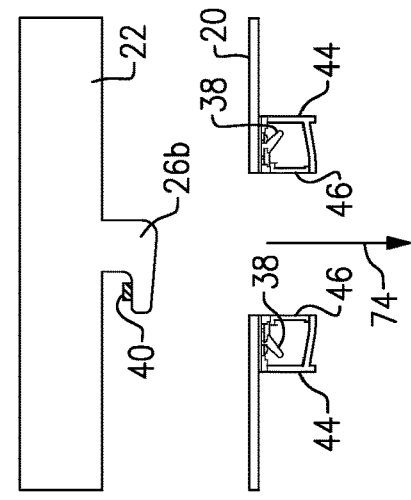

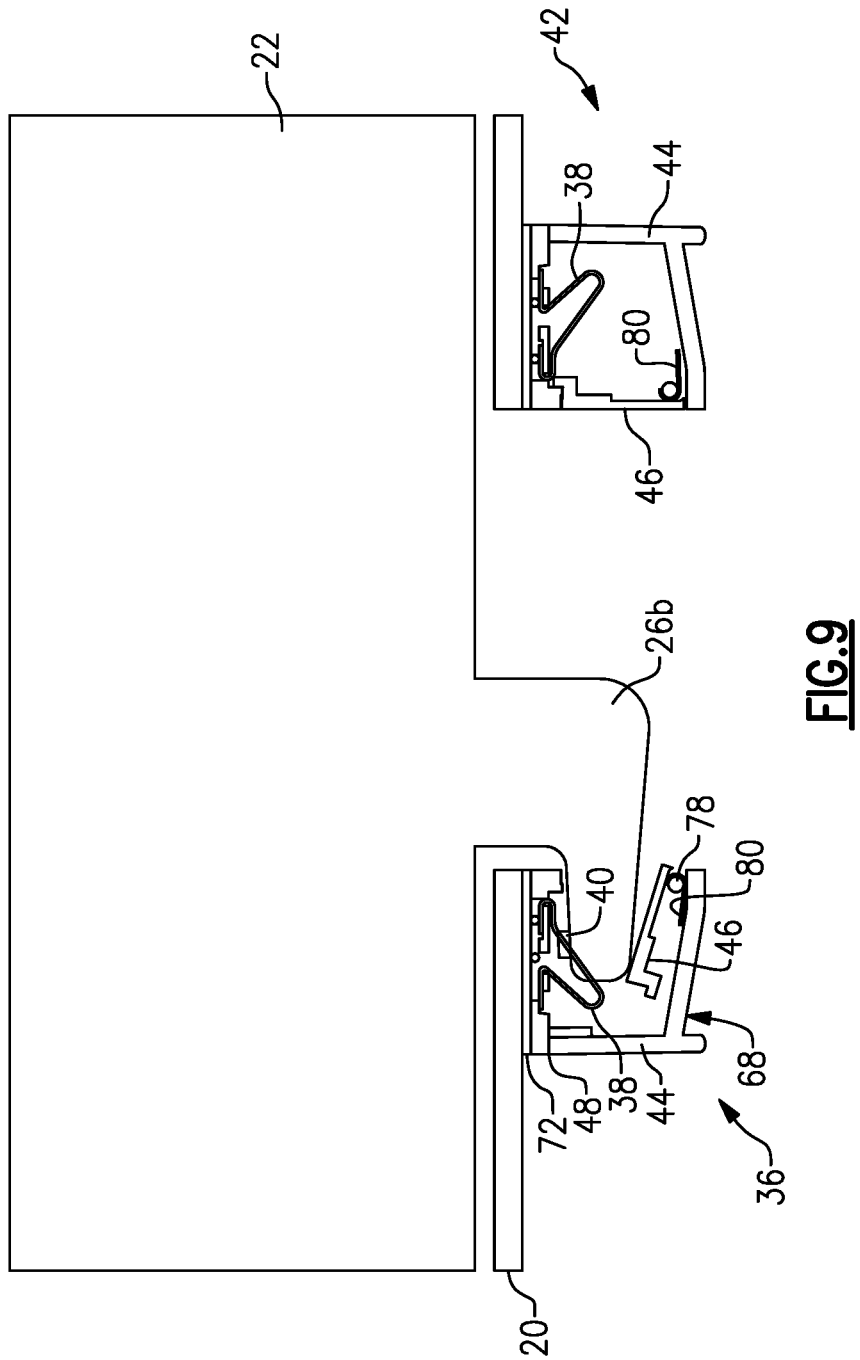

BASEPLATE ELECTRICAL CONTACTS

CROSS-REFERENCE TO RELATED APPLICATIONS

This application claims priority to U.S. Provisional Application No. 63/254,317, which was filed on 11 Oct. 2021 and is incorporated herein by reference.

TECHNICAL FIELD

This disclosure relates generally to an attachment system and, more particularly, to an attachment system that is used to secure accessories to a vehicle.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite.

SUMMARY

In some aspects, the techniques described herein relate to an accessory attachment system, including: a baseplate that provides an attachment interface on a vehicle; wherein the baseplate is configured to engage with an accessory to secure the accessory to the vehicle; and wherein the baseplate and the accessory are configured to electrically connect to each other through an electrical contact interface.

In some aspects, the techniques described herein relate to an attachment system, wherein the electrical contact interface comprises at least one first contact tab associated with the baseplate and at least one second contact tab associated with the accessory.

In some aspects, the techniques described herein relate to an attachment system, wherein the accessory includes at least one foot and the baseplate includes at least one aperture that is configured to receive the at least one foot, and wherein the at least one first contact tab comprises a plurality of first contact tabs that are located in a plurality of different mounting orientations, and wherein the at least one second contact tab is mounted on the at least one foot to selectively engage with one of the plurality of first contact tabs in the desired mounting orientation.

In some aspects, the techniques described herein relate to an attachment system, wherein the accessory is configured to be selectively detachable from one mounting orientation on the baseplate such that the accessory can immediately be reattached in a different one of the mounting orientations.

In some aspects, the techniques described herein relate to an attachment system, wherein the plurality of first contact tabs are located within a receiver housing that is mounted to the baseplate.

In some aspects, the techniques described herein relate to an attachment system, wherein the receiver housing includes a plurality of receiver compartments with each receiver compartment corresponding to one mounting orientation, and wherein the at least one foot is inserted into a selected one of the receiver compartments to mechanically lock the at least one foot in place while simultaneously engaging the at least one second contact tab with the respective first contact tab to electrically connect the accessory to the baseplate.

In some aspects, the techniques described herein relate to an attachment system, wherein each receiver compartment includes a spring-loaded door that is biased to a closed position, and wherein the spring-loaded door is moved to an open position when the at least one foot engages the spring-loaded door to enter the respective receiver compartment.

In some aspects, the techniques described herein relate to an attachment system, wherein each receiver compartment includes a pair of the first contact tabs.

In some aspects, the techniques described herein relate to an attachment system, wherein the receiver housing comprises a plate portion with a center opening to be aligned with a baseplate opening through which the at least one foot is to be inserted, and wherein the plate portion has a first surface that faces away from the baseplate and a second surface that faces opposite the first surface, and wherein the receiver housing includes supports that extend outwardly of the second surface and which are spaced about the center opening, and wherein the supports are configured to support spring-loaded doors for each receiver compartment.

In some aspects, the techniques described herein relate to an attachment system, wherein each receiver compartment includes a plurality of walls extending outwardly of the second surface to define each receiver compartment, and wherein the spring-loaded doors enclose each receiver compartment and face the center opening.

In some aspects, the techniques described herein relate to an attachment system, wherein pairs of the first contact tabs are mounted to extend through to the second surface in each receiver compartment, and wherein the at least one second contact tab is mounted on an upwardly facing surface of the at least one foot to selectively engage with one pair of the first contact tabs as the at least one foot is inserted into a selected one of the receiver compartments in the desired mounting orientation.

In some aspects, the techniques described herein relate to an attachment system, wherein the pairs of first contact tabs are connected to a common wiring harness.

In some aspects, the techniques described herein relate to an attachment system, wherein the system includes a gasket installed on the first surface of the plate portion to provide a seal for the plurality of first contact tabs.

In some aspects, the techniques described herein relate to an attachment system, wherein the attachment interface comprises a mechanical connection interface having a plurality of feet that are each received within one of a plurality of apertures when engaged.

In some aspects, the techniques described herein relate to an attachment system, wherein the baseplate is attached to a vehicle surface with an additional attachment interface.

In some aspects, the techniques described herein relate to an accessory attachment method, including: attaching an accessory to a baseplate supported by a vehicle by inserting at least one foot through an aperture to mechanically lock the at least one foot in place while simultaneously electrically connecting the accessory to the baseplate.

In some aspects, the techniques described herein relate to an attachment method, wherein the accessory includes the at least one foot and the baseplate includes the aperture, and including locating a plurality of first contact tabs on the baseplate in a plurality of different mounting orientations, and mounting at least one second contact tab on the at least one foot to selectively engage with one of the plurality of first contact tabs in the desired mounting orientation.

In some aspects, the techniques described herein relate to an attachment method, wherein the accessory is configured to be selectively detachable from one mounting orientation on the baseplate such that the accessory can immediately be reattached in a different one of the mounting orientations by:
   sliding the at least one foot out of the aperture;
   lifting the accessory away from the baseplate;
   rotating the accessory to a different mounting orientation;
   inserting the at least one foot into the aperture; and
   sliding the at least one foot through the aperture to mechanically lock the at least one foot in place while simultaneously electrically connecting the accessory to the baseplate.

In some aspects, the techniques described herein relate to an accessory attachment method, including: forming a receiving housing configured to be mounted to a baseplate supportable within a vehicle; providing a plurality of first contact tabs in the receiving housing, the first contact tabs configured to selectively engage at least one second contact tab on an accessory to be attached to the baseplate; providing a plurality of receiver compartments within the receiver housing with each receiver compartment corresponding to one mounting orientation; providing a pair of the first contact tabs in each receiver compartment; and installing a spring-loaded door for each receiver compartment that is biased to a closed position to protect the first contact tabs.

In some aspects, the techniques described herein relate to an attachment method, wherein the method includes installing a gasket on top of the plate portion to cover and seal the plurality of first contact tabs within the receiver housing.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 6a illustrates a bottom view of a power module being lowered into the baseplate of FIG. 3 in a first mounting orientation.

FIG. 6b illustrates a side view of a power module foot being lowered toward the baseplate of FIG. 6a.

FIG. 7a illustrates a bottom view of the power module being inserted into mounting apertures in the baseplate.

FIG. 7b illustrates a side view of the power module foot being lowered through a central mounting aperture to electrically connect to the baseplate of FIG. 7a.

FIG. 8a illustrates a bottom view of the power module being slid into the mounting apertures in the baseplate such that the power module is securely fixed to the baseplate.

FIG. 8b illustrates a side view of the power module foot slid into one of the electrical contact interfaces within the receiver housing to electrically connect the power module to the baseplate of FIG. 8a.

FIG. 9 is an enlarged view of FIG. 8B.

DETAILED DESCRIPTION

This disclosure details a baseplate-based accessory attachment system for a vehicle. The baseplate of the system provides an electrical contact interface for securing accessories/modules to the vehicle that require power. Various types of accessories or modules that require power can be secured to the vehicle through the electrical contact interface provided by the baseplate. The mounting orientation of the accessories and modules can be adjusted as needed using the same electrical contact interface. This provides a user with a substantially modular attachment system.

A modular electrical connection system disclosed herein provides a new method to allow the flexibility of a durable multi-directional, multi-use electrical interconnection system to allow internally or externally mounted upfit based modules to electrically connect to power and/or data circuits within the vehicle. This enables the possibility of switched or automatic power-up and signaling connections to the module upon connector engagement, while providing environmental protection that allows the use of the device in a variety of locations such as in an open bed of a pickup, a vehicle's trunk/frunk, an interior deck where the surface and module may be environmentally exposed to moisture, debris, salt mist or other similar contaminants. This disclosure explains the physical interfaces and structures that enable circuit engagement, multidirectional interconnect operation, and the desired environmental protection needed to ensure a high quality, durable connection between the upfit module and the vehicle.

There are often situations where it would be useful for the vehicle owner to be able to switch between different upfit systems to enable different functional capabilities, or to temporarily remove an upfit module to allow the module or its contents to be used off the vehicle, then reattach the module once the desired operation or task is completed. Traditional upfit integration of elements into a vehicle ecosystem by hard wiring, and bolt-on physical attachment make it difficult to easily change different types of electrical modules for use in different applications. The subject disclosure provides an integration method that allows both the mechanical and electrical attachment to the vehicle via a quick connect/disconnect capability.

The exemplary modular electrical connection system is designed to complement the quick connect/disconnect mechanical system. This electrical solution provides the option to make electrical power or data connections between a fixed mounting surface and a removable module or unit. The base system is composed of a separate module foot and receiver component in the baseplate that interact to make the quick connect/disconnect capability.

Figure 1:
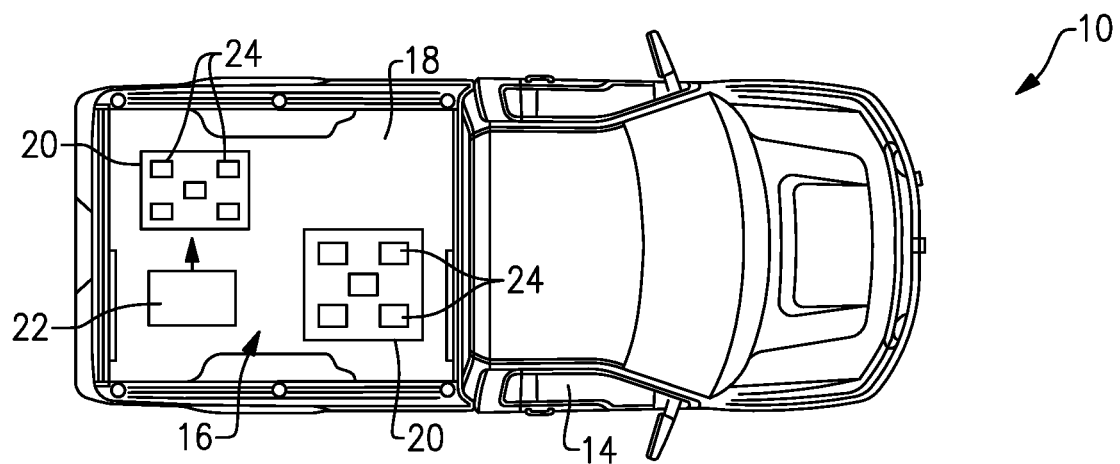
FIG. 1 illustrates a top view of a vehicle having a cargo bed equipped with baseplates that can be used to secure an accessory according to an exemplary aspect of the present disclosure.
Figure 2:
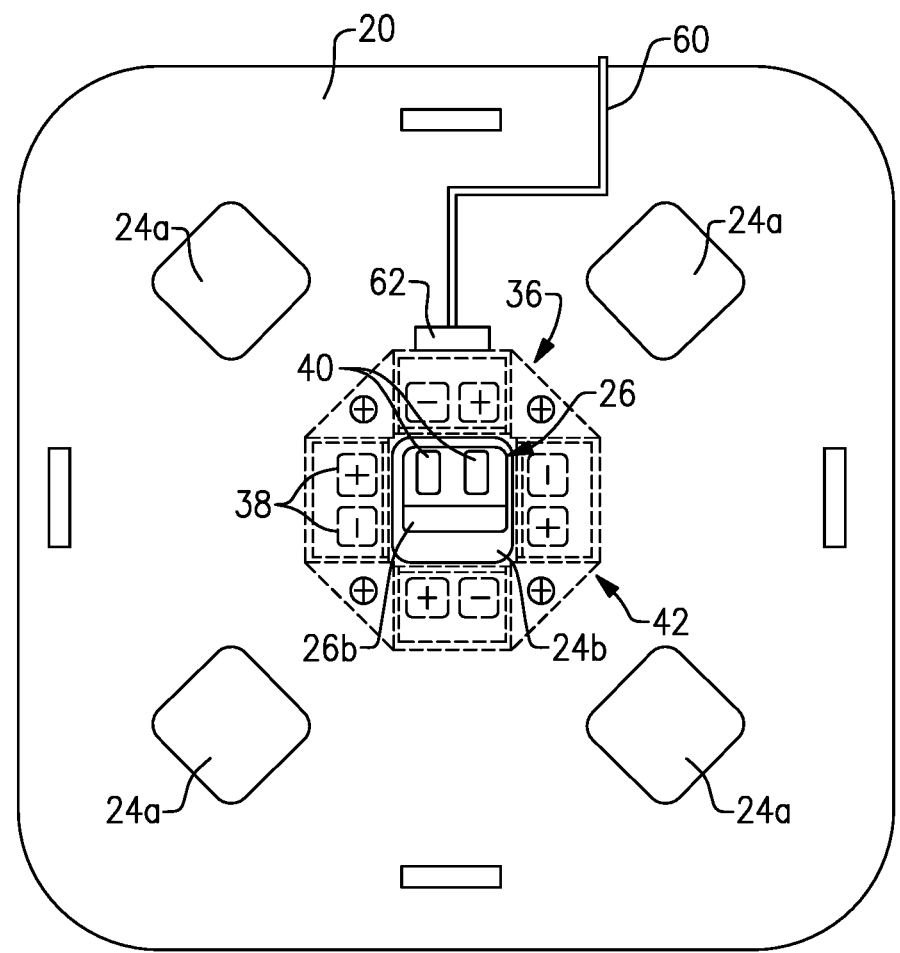
FIG. 2 illustrates a top view of one of the baseplates of FIG. 1 with a schematic showing of an electrical contact interface to provide electrical connection to a power module to be coupled with the baseplate.

FIGS. 1-9 disclose an exemplary embodiment of the accessory attachment system. With reference to FIGS. 1 and 2, a vehicle 10 includes a passenger compartment 14 and a cargo bed 16 that is aft of the passenger compartment 14. The cargo bed 16 has a floor 18. In this example, the vehicle 10 is a pickup truck. However, the vehicle 10 could be another type of vehicle in another example, such as a car, van, sport utility vehicle, etc.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional vehicle.

Figure 4:
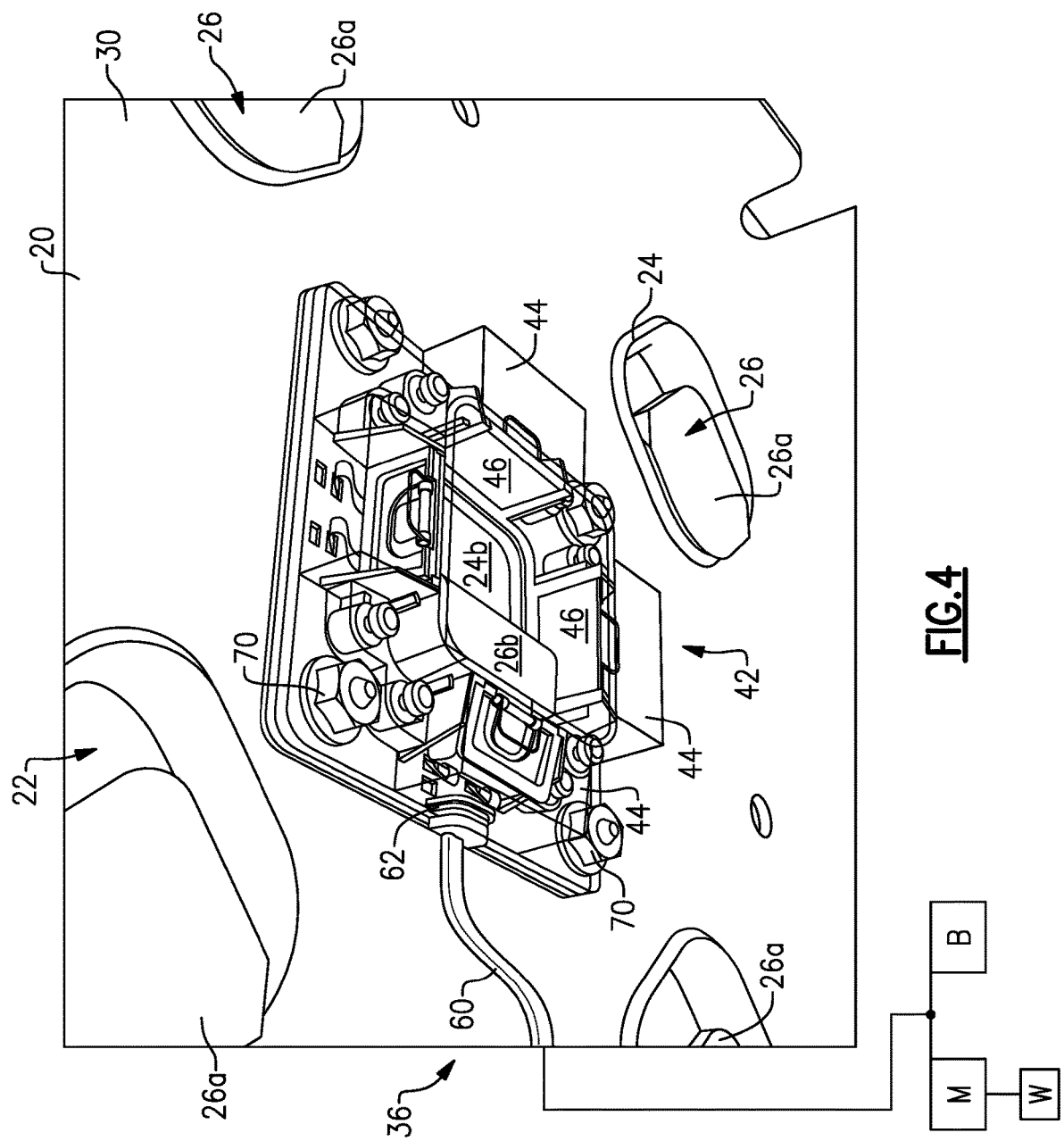
FIG. 4 illustrates a bottom perspective view of the baseplate and the receiver housing of FIG. 3.

In particular, the example vehicle 10 includes an electrified powertrain capable of applying a torque from an electric machine M (e.g., an electric motor) to drive a pair of wheels W (FIG. 4). The vehicle 10 can include a traction battery pack B, which powers the electric machine M and, potentially, other electrical loads of the vehicle 10.

In the exemplary embodiment, a plurality of baseplates 20 are secured to directly to the floor 18 of the cargo bed 16. The baseplates 20 can have different sizes. Various accessories and/or modules 22 can be secured to the vehicle 10 by engaging one or more of the baseplates 20. The accessories/modules 22 can include a lockable storage box that holds tools, a refrigerator, etc. The accessory 22 could be a lidded lockable container that includes a compartment for storing power tools or other items that require power or data connection.

With reference now to FIGS. 3-9 and continued reference to FIGS. 1 and 2, the accessories 22 can engage one or more of the baseplates 20 using an attachment system. In the exemplary embodiment, the attachment system includes a plurality of apertures 24 and at least one foot 26 that cooperate to provide a mechanical connection interface. The baseplate 20 is attached to a vehicle surface with an additional attachment interface. that is separate from the mechanical connection interface.

In this example, the baseplates 20 provide the apertures 24 and the accessories 22 include a plurality of feet 26. This could be rearranged, however, such that one or all of the feet 26 extend from the baseplates 20 and the accessories 22 provide some or all of the apertures 24.

In the exemplary embodiment, when the baseplate 20 and the accessories 22 are engaged, the feet 26 are each received within one of the apertures 24 such that the feet 26 each extend from a first side 28 of the baseplate 20, through one of the apertures 24, and past an opposite, second side 30 of the baseplate 20.

Mechanical fasteners, welds, or other methods of attachment could be used to secure peripheral flanges 32 of the baseplates 20 to the floor 18. The flanges 32 may include openings 34 to provide an attachment interface to fix the baseplates 20 to the floor 18. The apertures 24 are spaced upwardly from the floor 18 by an open gap such that the feet 26 from the accessory can be easily inserted into the baseplate 20 to attach the accessory 22 to the baseplate 20. The accessory 22 can then be removed and replaced with a different accessory 22 as needed. The user can, for example, hold tools for a certain type of job within the accessory 22. When the user needs to work on a different second type of job, the user can swap the accessory 22 for another accessory having specialized tools for the second type of job.

In the subject disclosure, the accessory 22 comprises a power module that is electrically coupled to the vehicle 10 through the baseplate 20. This allows the accessories 22 to be powered. For example, the accessory 22 could be a refrigerated container that is powered by the vehicle 10 when the accessory 22 is engaged with the baseplate 20. In another example, the accessory 22 could hold rechargeable tools, which can be recharged when set within the accessory 22 and coupled to an electrical charging interface between the accessory 22 and the baseplate 20.

The accessory 22 could also be in communication with the vehicle 10 through the baseplate 20. The accessory 22 could, for example, couple to a communication link or bus when the accessory is engaged with the baseplate 20. The vehicle 10 and user could rely on the communication link to identify what type of accessory 22 is coupled to the baseplate 20, or to help locate the accessory 22 on the vehicle 10.

An example of an accessory attachment method includes the step of attaching an accessory 22 to a baseplate 20 supported by the vehicle 10 by inserting at least one foot 26 through an aperture 24 to mechanically lock the at least one foot 26 in place while simultaneously electrically connecting the accessory 22 to the baseplate 20 through an electrical contact interface 36. As shown in FIG. 2, the baseplate 20 includes four apertures 24a that are configured to receive four feet 26a (FIG. 4) of the accessory 22. The baseplate 20 also includes an additional aperture 24b that is configured to receive a foot 26b of the accessory 22 that provides the electrical contact interface 36. In one example, the additional aperture 24b is centrally located on the baseplate 20 and the remaining apertures 24a are spaced apart from each other about a periphery of the baseplate 20. The associated foot 26b is also centrally located on the accessory 22 and the remaining feet 26b are spaced apart from each other about a periphery of the bottom surface of the accessory 22.

In one example, the electrical contact interface 36 comprises first contact tabs 38 associated with the baseplate 20 and one or more second contact tabs 40 associated with the accessory 22. The first contact tabs 38 are located in a plurality of different mounting orientations. In the example shown in FIG. 2, there are four different mounting configurations with each mounting orientation being set at ninety degrees relative to an adjacent mounting orientation. The second contact tabs 40 are mounted on the central foot 26b to selectively engage with one of the first contact tabs 38 in the desired mounting orientation.

The first contact tabs 38 comprise pairs of tabs (+/−) that are positioned at each of the four mounting locations. The second contact tabs 40 comprise one pair of tabs (+/−) mounted on the foot 26b. The foot 26b is inserted through the aperture 24b in a vertical or downward direction and then the foot 26b is slid axially in horizontal direction toward a selected one of the desired mounting orientations. When the foot 26b is slid in the desired direction, the set of second contact tabs 40 engage with the selected set of first contact tabs 38 to electrically connect the accessory 22 to the baseplate 20. The accessory 22 is configured to be selectively detachable from one mounting orientation on the baseplate 20 such that the accessory 22 can immediately be reattached in a different one of the mounting orientations. The attaching and detaching step can occur as many times as necessary to achieve the desired mounting orientation. The attaching and detaching step can also result from switching out one type of accessory 22 for another accessory 22.

In one example, the first contact tabs 38 are located within a receiver housing 42 that is mounted to the baseplate 20. As shown in FIG. 4, the receiver housing 42 includes a plurality of receiver compartments 44 with each receiver compartment 44 corresponding to one mounting orientation and including one set of first contact tabs 38. The receiver compartments 44 provide a protective box around the contact tabs 38. The foot 26b is inserted into a selected one of the receiver compartments 44 to mechanically lock the foot 26b in place while simultaneously engaging the set of second contact tabs 40 with the respective set of first contact tabs 38 to electrically connect the accessory 22 to the baseplate 20 at the electrical contact interface 36. FIG. 4 shows the four receiver compartments 44 with one compartment 44 being transparent such that one set of first contact tabs 38 is clearly visible and the foot 26b is shown as being engaged within one of the other compartments 44.

As shown in FIG. 4, each receiver compartment 44 includes a spring-loaded door 46 that is biased to a closed position. The spring-loaded door 46 is moved to an open position when the foot 26b engages the spring-loaded door 46 to enter the respective receiver compartment 44 by overcoming the biasing spring force. Sliding movement of the foot 26b in the selected horizontal direction provides the force to overcome the biasing force and open the selected spring-loaded door 46.

Figure 5A:
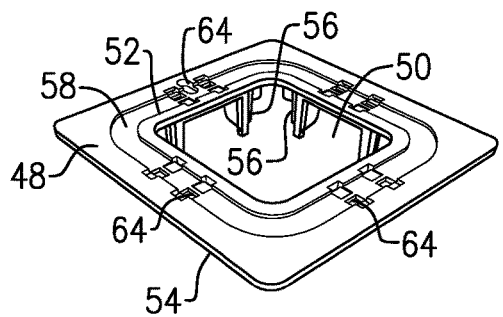
FIGS. 5a-5e illustrates a method of making the receiver housing.

FIGS. 5a-5e illustrates a method of making the receiver housing. FIG. 5a shows a plate portion 48 of the receiver housing 42. In one example, the plate portion 48 comprises an injection molded component. The plate portion 48 includes a center opening 50 that is to be aligned with the center aperture 24b in the baseplate 20. The plate portion 48 has a first surface 52 that faces away from the baseplate 20 and a second surface 54 that faces opposite the first surface 52. The plate portion 48 also includes injection molded supports 56 that extend outwardly of the second surface 54 and which are spaced about the center opening 50. In one example, the supports 56 are provided in pairs at each mounting orientation and each pair is configured to support one spring-loaded door 46 for a respective receiver compartment 44. The injection molded plate portion 48 also includes grooves 58, depressions, recesses, etc. that are configured to receive wiring 66 to connect the first contact tabs 38 to a power distribution harness 60 via a connector 62 (FIG. 2). The power distribution harness 60 receives power from the electrical/power system of the vehicle. The plate portion 48 includes sets of openings 64 for the first contact tabs 38. One set of openings 64 are used for each of the mounting orientations.

Figure 5B:
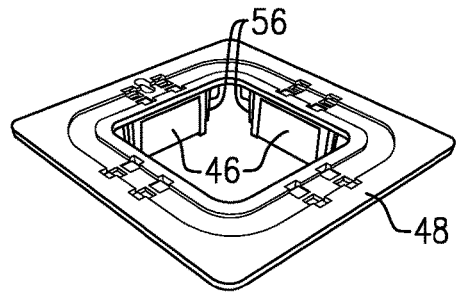
Figure 5C:
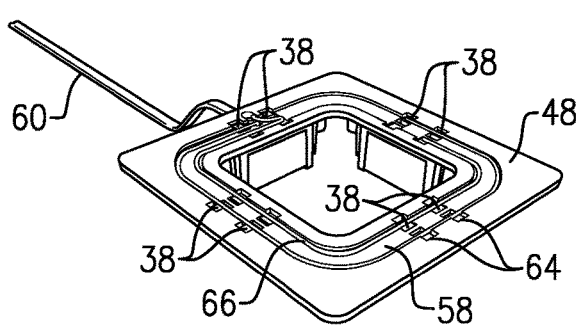

FIG. 5b shows a step of installing the spring-loaded doors 46 in a two shot process. FIG. 5c shows the steps of installing the power distribution harness 60, wiring 66, and first contact tabs 38. Thus, the pairs of first contact tabs 38 are connected to a common wiring harness 60. The first contact tabs 38 are mounted within the openings 64 such that the tabs 38 extend through the thickness of the plate portion 48 to protrude beyond the second surface 54.

Figure 5D:
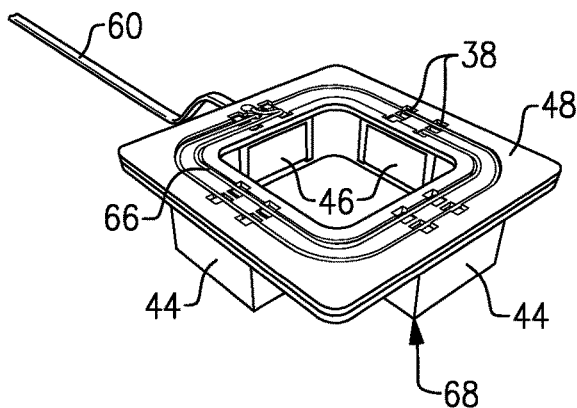

FIG. 5d shows the step of installing the receiver compartment housing 68 onto the second surface 54 of the plate portion 48. Each compartment 44 of the receiver compartment housing 68 is defined by a plurality of walls extending outwardly of the second surface 54 and the spring-loaded doors 46 enclose an open side of each receiver compartment 44 and face the center opening 50. The receiver compartment housing 68 can be attached to the baseplate 20 via fasteners 70 or sonic welding. FIG. 4 shows an example of fasteners 70 being used for securement.

Figure 3:
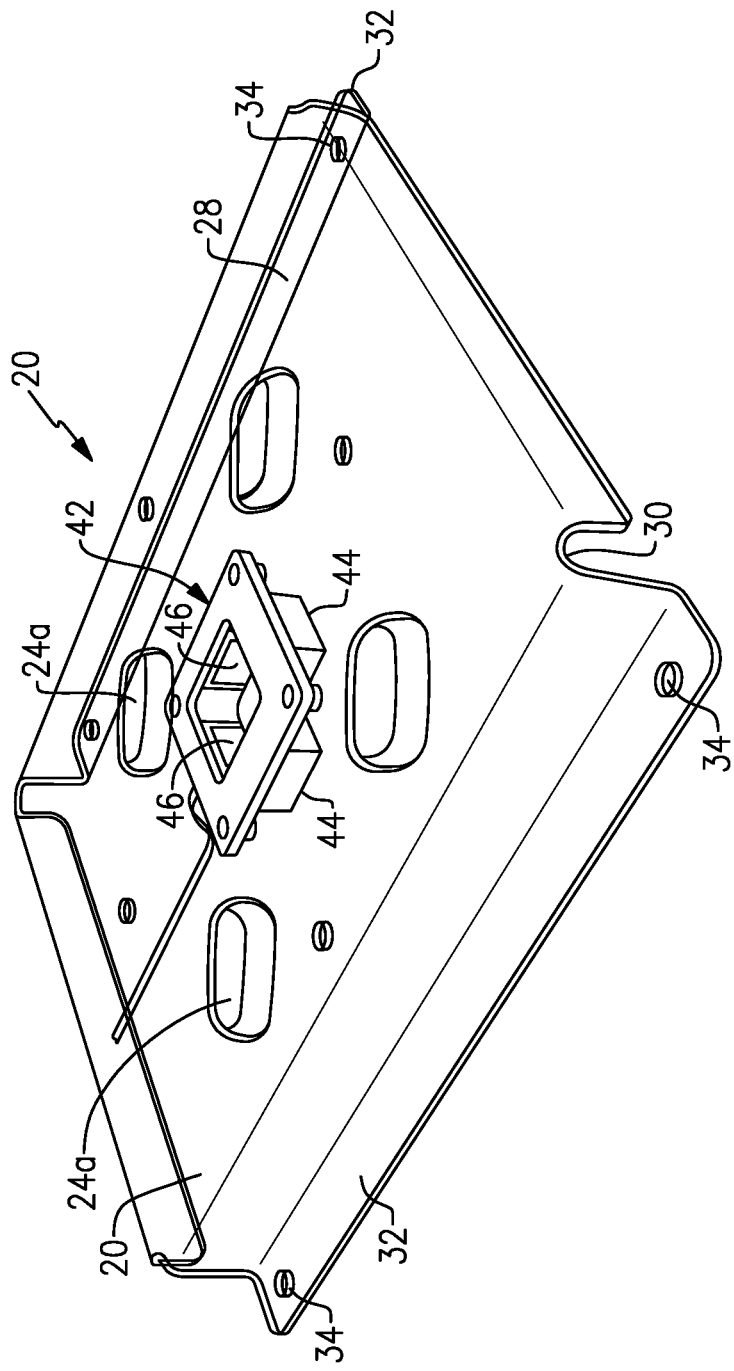
FIG. 3 illustrates a top perspective view of the electrical contact interface of FIG. 2 installed within a receiver housing that is attached to the baseplate.
Figure 5E:
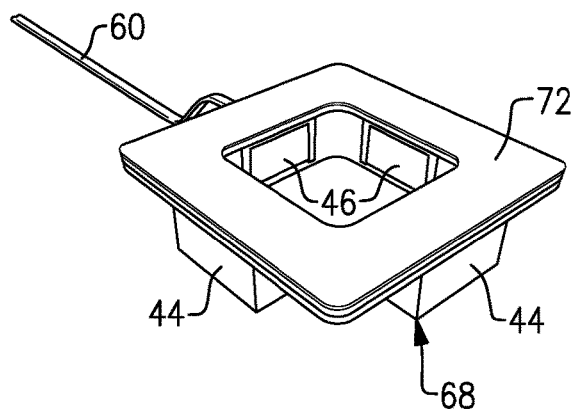

FIG. 5e shows the step of installing a gasket 72 to complete the assembly of the receiver housing 42. The gasket 72 is installed on the first surface 52 of the plate portion 48 to provide a seal for the plurality of first contact tabs 38 and the associated wiring 66. The receiver housing 42 is then installed onto the baseplate 20 as shown in FIGS. 3-4.

FIGS. 6a-8b show the process of installing the foot 26b into the center aperture 24b to electrically connect the power module accessory 22 to the baseplate 20. As shown in FIG. 6a, the first contact tabs 38 are mounted to extend through the plate portion 48 to protrude beyond the second surface 54 in each receiver compartment 44. The second contact tabs 40 are mounted on an upwardly facing surface of the foot 26b (FIG. 2) to selectively engage with one pair of the first contact tabs 38 as the foot 26b is inserted into a selected one of the receiver compartments 44 in the desired mounting orientation.

FIG. 6a shows the feet 26a of the accessory 22 entering the apertures 24a and the central foot 26b entering the central aperture 24b. The foot 26b is inserted in a vertical downward direction as indicated by arrow 74 in FIG. 6b. The spring-loaded doors 46 are in the closed position.

FIG. 7a shows the feet 26a of the accessory 22 fully inserted within the apertures 24a and the central foot 26b fully inserted within the central aperture 24b as shown in FIG. 7b. The spring-loaded doors 46 remain in the closed position.

FIG. 8a shows the feet 26a of the accessory 22 being slid axially in a horizontal direction within the apertures 24a to mechanically secure the accessory 22 in place. The central foot 26b is also slid axially in the horizontal direction (see arrow 76) within the central aperture 24b to mechanically secure the accessory 22 while simultaneously electrically connecting the accessory 22 to the baseplate 20 as shown in FIG. 8b. The selected spring-loaded door 46 is pushed to an open position and the other spring-loaded doors 46 remain in the closed position.

FIG. 9 shows an enlarged view of the electrical connection interface 36. An upper surface of the foot 26b includes the second contact tabs 40 (best seen in FIG. 2) that directly engage the first contact tabs 38. The bottom surface of the foot 26b contacts a front face of the spring-loaded door 46 to pivot the door 46 about an axis 78 to open the selected receiver compartment 44. FIG. 9 shows an example of a spring 80 mounted at the axis 78 to provide the biasing force. The door 46 can be configured to pivot about different axes other than that shown. Once the foot 26b is slid fully into the compartment 44, the electrical connection is made and power is transferred to the accessory via the power distribution harness 60 that is connected to the vehicle power source.

The system of the subject disclosure provides custom electrical quick connect/disconnect electrical circuit capability for traditional and upfit based vehicle modules and powered accessories 22. This system can also be used to connect modules mounted in both protected and external surfaces within the vehicle. It allows for multiple mounting locations for a single module and provides for flexibility of configuration or location of multiple modules on the mounting surface. The solution provides basic environmental protection to the contacts for use and installation in wet environments and provides a highly flexible alternative to traditional wiring for such environments.

As discussed above, the receiver housing 42 is designed to provide multiple connection ports contained within protective compartments 44 with spring contacts 38 corresponding to the connection contacts 40 located on the module foot 26b. The receiver compartments 44 are designed to provide environmental protection and include a spring loaded door 46 that opens when the module foot 26b presses against the door as the foot 26b is inserted to make the electrical connection. The compartment 44 and foot 26b are designed and shaped to guide the foot 26b into the proper location to align the appropriate compartment spring contact 38 and the corresponding foot contact 40 while being inserted to prevent short circuits or incorrect circuit interconnections. The spring contacts 38 are designed such that there is there is limited interference with the foot 26*b* as it is being inserted to ensure that when the foot 26*b* is fully inserted that the spring contact 38 is appropriately loaded so that the contact is pressing firmly against the foot contact 40 to ensure that solid contact between the components is maintained during operation, whether the vehicle is moving or parked, for the life of the component. Both the compartment spring contact 38 and the foot contact 40 are sufficiently plated to ensure appropriate conduction for the life of the components. Corresponding slot spring contacts in each of the compartments 44 are interconnected so that regardless of which compartment 44 is used to connect to the module 22 via the foot 26*b*, the interconnect sequence is equivalent.

It is possible however to make unique connection patterns within each compartment 44 to support multiple configuration patterns or application specific modules, though in this disclosure the pin sequence in each compartment is the same for clarity. The receiver housing 42 is connected to the vehicle via traditional automotive grade connectors, with appropriate contacts corresponding to the number of and the current capacity for each individual spring pin (or pins) requiring independent connection. The receiver connector 62 can be either an integrated pigtail or molded into the receiver housing 42. The number of compartments 44 within the receiver housing 42 can vary to appropriately match the number of module installation options, which will typically be 1, 2, or 4, but is not restricted these options. For illustration purposes, this disclosure depicts the receiver as having 4 compartments 44.

The module foot 26*b* is designed as a stand-alone component that is attached to a bottom surface of a module 22. Each of the foot contacts 40 is wired independently. Each contact has a corresponding wire attached to the contact. These wires exit the module thru a port in the mounting surface. A corresponding port in the bottom of the module 22 allows the wiring to enter the module 22 for interconnection into the module's internal electrical/electronic elements. The gasket 72 is included to ensure appropriate environmental protection, and foot mounting is accomplished via bolts, screws, or other fixing method. The current opening in the mounting surface illustrated in this disclosure is square to correspond to the square mounting pattern of the associated mounting baseplate 20. The specific size and shape of the opening in the deck of the mounting surface would correspond to the mounting operation, number and size of contacts, and displacement required for proper contact engagement. Specific dimensions of the receiver housing and foot can be modified to correspond to a specific application.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An accessory attachment system, comprising:
 a baseplate that provides an attachment interface on a vehicle, the baseplate having a first surface and a second surface facing opposite the first surface, and wherein the baseplate is configured to engage with an accessory to secure the accessory to the vehicle, the baseplate and the accessory configured to electrically connect to each other through an electrical contact interface; and
 at least one interface aperture extending through a thickness of the baseplate from the first surface to the second surface, wherein the electrical contact interface comprises at least one first contact tab associated with the baseplate and at least one second contact tab associated with a portion of the accessory that is inserted through the at least one interface aperture to make contact with the at least one first contact tab.

2. The attachment system of claim 1, wherein the first surface comprises a support surface for the accessory, and wherein the at least one first contact tab is mounted to the second surface about a periphery of the at least one interface aperture and wherein the at least one second contact tab is inserted through the at least one interface aperture in a first direction and then moved in a second direction different than the first direction to engage the at least one first contact tab.

3. An accessory attachment system, comprising:
 a baseplate that provides an attachment interface on a vehicle, the baseplate configured to engage with an accessory to secure the accessory to the vehicle, the baseplate and the accessory configured to electrically connect to each other through an electrical contact interface;
 wherein the electrical contact interface comprises at least one first contact tab associated with the baseplate and at least one second contact tab associated with the accessory; and
 wherein the accessory includes at least one foot and the baseplate includes at least one aperture that is configured to receive the at least one foot, and wherein the at least one first contact tab comprises a plurality of first contact tabs that are located in a plurality of different mounting orientations, and wherein the at least one second contact tab is mounted on the at least one foot to selectively engage with one of the plurality of first contact tabs in a desired mounting orientation.

4. The attachment system of claim 3, wherein the accessory is configured to be selectively detachable from one mounting orientation on the baseplate such that the accessory can immediately be reattached in a different one of the mounting orientations.

5. The attachment system of claim 3, wherein the plurality of first contact tabs are located within a receiver housing that is mounted to the baseplate.

6. The attachment system of claim 5, wherein the receiver housing includes a plurality of receiver compartments with each receiver compartment corresponding to one mounting orientation, and wherein the at least one foot is inserted into a selected one of the receiver compartments to mechanically lock the at least one foot in place while simultaneously engaging the at least one second contact tab with the respective first contact tab to electrically connect the accessory to the baseplate.

7. The attachment system of claim 6, wherein each receiver compartment includes a spring-loaded door that is biased to a closed position, and wherein the spring-loaded door is moved to an open position when the at least one foot engages the spring-loaded door to enter the respective receiver compartment.

8. The attachment system of claim 6, wherein each receiver compartment includes a pair of the first contact tabs.

9. The attachment system of claim 6, wherein the receiver housing comprises a plate portion with a center opening to be aligned with a baseplate opening through which the at least one foot is to be inserted, and wherein the plate portion has a first surface that faces away from the baseplate and a second surface that faces opposite the first surface, and wherein the receiver housing includes supports that extend outwardly of the second surface and which are spaced about the center opening, and wherein the supports are configured to support spring-loaded doors for each receiver compartment.

10. The attachment system of claim 9, wherein each receiver compartment includes a plurality of walls extending outwardly of the second surface to define each receiver compartment, and wherein the spring-loaded doors enclose each receiver compartment and face the center opening.

11. The attachment system of claim 10, wherein pairs of the first contact tabs are mounted to extend through to the second surface in each receiver compartment, and wherein the at least one second contact tab is mounted on an upwardly facing surface of the at least one foot to selectively engage with one pair of the first contact tabs as the at least one foot is inserted into a selected one of the receiver compartments in the desired mounting orientation.

12. The attachment system of claim 11, wherein the pairs of first contact tabs are connected to a common wiring harness.

13. The attachment system of claim 12, including a gasket installed on the first surface of the plate portion to provide a seal for the plurality of first contact tabs.

14. The attachment system of claim 1, wherein the attachment interface comprises a mechanical connection interface having a plurality of feet that are each received within one of a plurality of mounting apertures when engaged, and wherein the at least one interface aperture is surrounded by the plurality of mounting apertures.

15. The attachment system of claim 14, wherein the baseplate is attached to a vehicle surface with an additional attachment interface.

16. The attachment system of claim 14, wherein:
the first surface comprises a support surface for the accessory;
the plurality of mounting apertures extend through the thickness of the baseplate; and
the plurality of feet each comprise a longitudinally extending portion that transitions into a laterally extending portion that has a distal end, and wherein the distal end faces the second surface to secure the accessory to the baseplate.

17. The attachment system of claim 16, wherein:
the plurality of feet include at least one electrical contact interface foot;
the at least one first contact tab comprises a plurality of first contact tabs that are mounted on the second surface of the baseplate about a periphery of the at least one interface aperture; and
the at least one second contact tab is mounted on a surface of the laterally extending portion of the at least one electrical contact interface foot and is selectively engageable with any one of the plurality of first contact tabs.

18. The attachment system of claim 1, including a plurality of mounting apertures formed in the baseplate to receive mounting feet associated with the accessory, and wherein the at least one interface aperture is distinct and separate from the plurality of mounting apertures.

19. The attachment system of claim 18, wherein the portion of the accessory comprises at least one interface foot, and wherein the mounting feet are inserted through the plurality of mounting apertures simultaneously with the at least one interface foot being inserted through the at least one interface aperture to lock the accessory in place on the baseplate and make an electrical connection through the electrical contact interface.

20. The attachment system of claim 19, wherein the mounting feet and the at least one interface foot are moveable in a first direction while being inserted through the respective plurality of mounting apertures and the at least one interface aperture, and wherein the mounting feet and the at least one interface foot are then moved in a second direction different than the first direction to lock the accessory in place on the baseplate and make the electrical connection through the electrical contact interface.

* * * * *